US011839854B2

(12) United States Patent
Kamel et al.

(10) Patent No.: US 11,839,854 B2
(45) Date of Patent: Dec. 12, 2023

(54) REVERSE OSMOSIS UNIT

(71) Applicants: Paul Kamel, Los Angeles, CA (US); Kelly Sullivan, Carson, CA (US); Steven T. Yoshimura, Torrance, CA (US); Bruce Worsley, Carson, CA (US); Salvador Lopez, Carson, CA (US)

(72) Inventors: Paul Kamel, Los Angeles, CA (US); Kelly Sullivan, Carson, CA (US); Steven T. Yoshimura, Torrance, CA (US); Bruce Worsley, Carson, CA (US); Salvador Lopez, Carson, CA (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 203 days.

(21) Appl. No.: 17/376,961

(22) Filed: Jul. 15, 2021

(65) Prior Publication Data
US 2022/0016574 A1 Jan. 20, 2022

Related U.S. Application Data (60) Provisional application No. 62/705,768, filed on Jul. 15, 2020.

(51) Int. Cl.
*B01D 61/06* (2006.01)
*B01D 61/10* (2006.01)
(Continued)

(52) U.S. Cl.
CPC .............. *B01D 61/06* (2013.01); *B01D 61/10* (2013.01); *C02F 1/441* (2013.01);
(Continued)

(58) Field of Classification Search
CPC .. B01D 61/06; B01D 2313/246; B01D 61/10; B01D 61/025; B01D 61/08;
(Continued)

(56) References Cited

U.S. PATENT DOCUMENTS 6,491,813 B2    12/2002  Verde
6,652,741 B1 *  11/2003  Marinzet ................ B01D 61/06
                                                              417/313

(Continued)

FOREIGN PATENT DOCUMENTS

FR    2850038 B1    3/2005
GB    2020569 A    11/1979
(Continued)

OTHER PUBLICATIONS

English language machine translation of JPH0952025A, 13 Pages, No Date.*

(Continued)

*Primary Examiner* — Pranav N Patel
(74) *Attorney, Agent, or Firm* — Reinhart Boerner Van Deuren P.C.

(57) ABSTRACT

An energy recovery system for use in a reverse osmosis system is provided. The energy recovery system has a pair of double headed pistons that reciprocate to pressurize unfiltered water into a reverse osmosis filtration unit. High pressure wastewater from the reverse osmosis filtration unit is used in conjunction with a pump to pressurize the unfiltered water that is pumped to the reverse osmosis filtration unit.

18 Claims, 8 Drawing Sheets

(51) Int. Cl.
    *C02F 1/44*     (2023.01)
    *F16K 31/122*     (2006.01)
    *F16K 31/363*     (2006.01)

(52) U.S. Cl.
    CPC ........ *F16K 31/1225* (2013.01); *F16K 31/363* (2013.01); *B01D 2313/041* (2022.08); *B01D 2313/08* (2013.01); *B01D 2313/18* (2013.01); *B01D 2313/243* (2013.01); *B01D 2313/246* (2013.01); *C02F 2303/10* (2013.01)

(58) Field of Classification Search
    CPC ............ B01D 2311/14; B01D 2313/04; B01D 2313/08; B01D 2313/243; B01D 2313/50; B01D 61/12; B01D 2313/18; C02F 1/441; C02F 2103/08; C02F 1/001; C02F 2303/10; C02F 2201/005; C02F 2201/004; C02F 2209/005; C02F 2209/03; C02F 2209/40; F04B 5/02; F04B 1/0408; F04B 1/124; F04B 11/0083; F04B 7/0053
See application file for complete search history.

(56) References Cited

U.S. PATENT DOCUMENTS

| | | | |
|---|---|---|---|
| 9,694,323 | B2 | 7/2017 | Tanigawa |
| 9,950,298 | B2 | 4/2018 | Bassett et al. |
| 2015/0083666 | A1* | 3/2015 | Bassett ................. B01D 61/06 137/625.69 |

FOREIGN PATENT DOCUMENTS

| | | | |
|---|---|---|---|
| JP | H0952025 | * | 2/1997 |
| JP | 2020089850 A | | 6/2020 |

OTHER PUBLICATIONS

Parker-Hannifin Corporation, RO-Boost Service Instruction, Jun. 28, 2012, 19 pages.
The Clark Pump, http://www.ecohydrosolutions.com/Technologies/Clark.html, known to applicant on or before Jun. 18, 2020.
Schenker, https://schenkerwatermakers.com/?gclid=CiwKCAjwxLH3BRApEiwAgX9aqUQevSaoaX8LZoclmHniqJiN5XrNE07wzi4XXSxCe17HKgdlcLoQSRoCBGKQAvD_BwE, known to applicant on or before Jun. 18, 2020.
Ecosistems, https://eco-sistems.com/en, known to applicant on or before Jun. 18, 2020.

* cited by examiner

REVERSE OSMOSIS UNIT

CROSS-REFERENCE TO RELATED PATENT APPLICATIONS

This patent application claims the benefit of U.S. Provisional Patent Application No. 62/705,768, filed Jul. 15, 2020, the entire teachings and disclosure of which are incorporated herein by reference thereto.

FIELD OF THE INVENTION

This invention generally relates to compact reverse osmosis units and particularly energy recovery systems for compact reverse osmosis units.

BACKGROUND OF THE INVENTION

Reverse osmosis units filter water by passing water through a membrane at high pressures. In many reverse osmosis units, only a portion of the incoming unfiltered water is filtered and a portion of the unfiltered water exits the system without being filtered. However, due to the elevated pressures required for the reverse osmosis process, this unfiltered water that exits the system exits at an elevated pressure.

It takes energy to pressurize the unfiltered water to the necessary pressure to pass the unfiltered water through the membrane. As such, simply disposing of the unfiltered water that exits the system that does not pass through the membrane at an elevated pressure is a significant loss in energy.

Therefore, many reverse osmosis units use an energy recovery system in combination with a pump to pressurize the unfiltered water upstream of the membrane. The energy recovery system uses the high pressure wastewater downstream of the membrane to assist in pressurizing the unfiltered water upstream of the membrane, thereby recovering, at least a portion, of the energy stored in the high pressure wastewater.

For example, in some energy recovery systems, double ended pistons having piston heads on opposed ends of the piston are used to pressurize the unfiltered water upstream of the membrane. In some arrangements, the pump pressurizes unfiltered water, which is exposed to a first one of the piston heads while the high pressure wastewater that exits the membrane acts on the second piston head. Both flows of water act to drive the piston in a same direction. One of the piston heads will also act on unfiltered water and push that water to and through the reverse osmosis unit.

Some example of energy recovery systems and reverse osmosis units include U.S. Pat. Nos. 9,950,298; 9,694,323; JP 2020089850; GB 2020569 and FR 2850038. Examples of the present disclosure provide improvements over the current state of the art, such as faster startup times as well as improved efficiencies.

BRIEF SUMMARY OF THE INVENTION

New and improved examples of reverse osmosis energy recovery systems are provided as well as reverse osmosis systems incorporating the energy recovery systems.

In one example, a reverse osmosis energy recovery system includes first and second pistons, a water pump water conduit, a wastewater conduit and a release valve. The first piston has a first piston head and a second piston head connected to the first piston head. The first and second piston heads each have a pump side and a wastewater side. The second piston has a third piston head and a fourth piston head connected to the third piston head. The third and fourth piston heads each have a pump side and a wastewater side. The pump water conduit is configured to selectively supply water from a pump to the pump side of the first, second, third and fourth piston heads. The wastewater conduit is configured to selectively supply pressurized wastewater from a reverse osmosis filter arrangement to the wastewater side of the of first, second, third and fourth piston heads. Appropriate check valves may be provided. The release valve has a valve body having a pump water inlet port in fluid communication with the pump water conduit, a wastewater inlet port in fluid communication with the wastewater conduit, and a drain port. The release valve has a valve member within the valve body movable between a first position in which fluid is prevented from flowing from the wastewater inlet port to the drain port and a second position in which fluid is permitted to flow from the wastewater inlet port to the drain port.

In one embodiment, fluid is permitted to flow from the wastewater inlet port to the drain port when the pressure within the pump water conduit drops, such as when a connected pump is deenergized. Fluid is prevent to flow when pressure within the pump water conduit rises, such as when a connected pump is energized. This arrangement can prevent pressure locking of the pistons due to the wastewater pressure acting on the wastewater sides of the pistons.

In one example, the valve member has a length between a distal end thereof and an o-ring carried thereby of between about 0.262 and 0.274 inches. This distance can assist in reduced pressure ramp up time for the system.

In one example, the valve member carries first and second o-rings. The first and second o-rings are axially spaced apart along an axis defined by the valve member. The first o-ring is axially spaced from a first end of the valve member between about 0.262 and 0.274 inches and the second o-ring is axially spaced from a second end of the valve member between about 0.262 and 0.274 inches.

In one example, the valve member translates within the valve body along the axis between the first and second positions.

In one example, the first o-ring is located between and seals the wastewater inlet port from the drain in the first position and the second o-ring is located between and seals the pump water inlet port from the drain in the first position. The first o-ring does not seal the wastewater inlet port from the drain in the first position.

In one example, the first o-ring is located between and seals the pump water inlet port from the drain in the second position.

In one example, a first end of the valve member has a first region and a second region. The wastewater within the wastewater conduit acts against only the first region when the valve member is in the first position. The second end of the valve member has a first region and a second region. Pressurized pump water acts on the first and second regions when the valve member is in the first position In one example, a reverse osmosis system is provided. The system includes a reverse osmosis energy recovery system. The system also includes a pump fluidly connected to the pump water conduit and a reverse osmosis filter arrangement having a wastewater outlet fluidly connected to the wastewater conduit.

When the pump is deenergized, the release valve releases pressure within the wastewater conduit. This prevents pressure locks within the system at startup of the system.

In another example, a reverse osmosis energy recovery system is provided. The system includes a first piston. The first piston includes first and second piston heads and first and second piston rods. The first piston head and second piston head are connected. The first and second piston heads each have a pump side and a wastewater side. The first and second piston rods connect the first piston head to the second piston head. Each of the first and second piston rods have opposed, spaced apart first and second cylindrical portions and a reduced diameter region interposed between the first and second cylindrical portions. The reduced diameter region has a maximum diameter of between 0.385 and 0.395 inches.

In one example, the first and second piston rods each have first and second transition regions. The first transition region tapers from the first cylindrical portion to a first end of the reduced diameter region. The second transition region tapers from the second cylindrical portion to a second end of the reduced diameter region.

In one example, the maximum diameter of the reduced diameter region is at the first and second ends.

In one example, the reduced diameter region has a midpoint between the first and second ends. The midpoint has a minimum diameter of the reduced diameter region that is between 0.378 and 0.386 inches.

In one example, a first portion of the reduced diameter region between the first end and the midpoint tapers between the first end and the midpoint. The diameter of the first portion decreases when moving from the first end toward the midpoint. A second portion of the reduced diameter region between the second end and the midpoint tapers between the second end and the midpoint. The diameter of the second portion decreases when moving from the second end toward the midpoint.

In one example, at least one pressure relief groove has a first end formed in the first cylindrical portion and a second end formed in the first transition region. At least one pressure relief groove has a first end formed in the second cylindrical portion and a second end formed in the second transition region.

In one example, a first intersection between the first cylindrical portion and the first transition region is spaced along a longitudinal axis of the piston rod a length of between 0.651 and 0.675 inches from a second intersection between the second cylindrical portion and the second transition region.

In one example, the first transition region has an axial length along the longitudinal axis measured between the first intersection and the first end of between 0.0855 and 0.1055 inches. The second transition region has an axial length along the longitudinal axis measured between the second intersection and the second end of between 0.0855 and 0.1055 inches.

In one example, the piston head is received in a piston cylinder. The piston head has an outer diameter of between 1.869 and 1.873 inches and the piston cylinder has an inner diameter of between 1.875 and 1.879 inches.

In one example, a second piston is provided. The second piston has a third piston head and a fourth piston head connected to the third piston head. The third and fourth piston heads each have a pump side and a wastewater side. Third and fourth piston rods connect the third piston head to the fourth piston head, each of the third and fourth piston rods having opposed, spaced apart first and second cylindrical portions and a reduced diameter region interposed between the first and second cylindrical portions, the reduced diameter region having a maximum diameter of between 0.385 and 0.395 inches.

In one example, the piston rods of the first piston provide wastewater flow control while the second piston is being driven to pressurize water and the piston rods of the second piston provide wastewater flow control while the first piston is being driven to pressure water.

In one example, the first piston is located within a first piston cylinder. The first piston cylinder includes a depressurized wastewater outlet chamber in fluid communication with a drain and first and second depressurized wastewater inlet chambers. The depressurized wastewater outlet chamber may be positioned between the first and second depressurized wastewater inlet chambers. The second piston rod extends through the depressurized wastewater outlet chamber and first and second depressurized wastewater inlet chambers. The reduced diameter region of the second piston rod fluidly communicates the first depressurized wastewater inlet chamber with the depressurized wastewater outlet chamber in a first piston first position. The reduced diameter region of the second piston rod fluidly communicates the second depressurized wastewater inlet chamber with the depressurized wastewater outlet chamber in a first piston second position. The first cylindrical portion of the second piston rod seal the second depressurized wastewater inlet chamber when in the first piston first position. The second cylindrical portion of the second piston rod seal the first depressurized wastewater inlet chamber when in the first piston second position.

The first piston cylinder includes a high pressure wastewater inlet chamber in fluid communication with a high pressure wastewater outlet of a reverse osmosis filtration unit. The first piston cylinder includes first and second high pressure wastewater outlet chambers. The high pressure wastewater inlet chamber may be positioned between the first and second high pressure wastewater outlet chambers. The first piston rod extends through the high pressure wastewater inlet chamber and first and second high pressure wastewater outlet chambers. The reduced diameter region of the first piston rod fluidly communicating the first high pressure wastewater outlet chamber with the high pressure wastewater inlet chamber in the first piston first position. The reduced diameter region of the first piston rod fluidly communicates the second high pressure wastewater outlet chamber with the high pressure wastewater inlet chamber in the first piston second position. The first cylindrical portion of the first piston rod seals the second high pressure wastewater outlet chamber when in the first piston first position. The second cylindrical portion of the first piston rod seals the first high pressure wastewater outlet chamber when in the first piston second position.

The first and second cylindrical portions of the first piston rod seal both the first and second high pressure wastewater outlet chambers when the first piston is in a first piston third position. The first and second cylindrical portions of the second piston rod seal both the first and second depressurized wastewater inlets when the first piston is in the first piston third position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
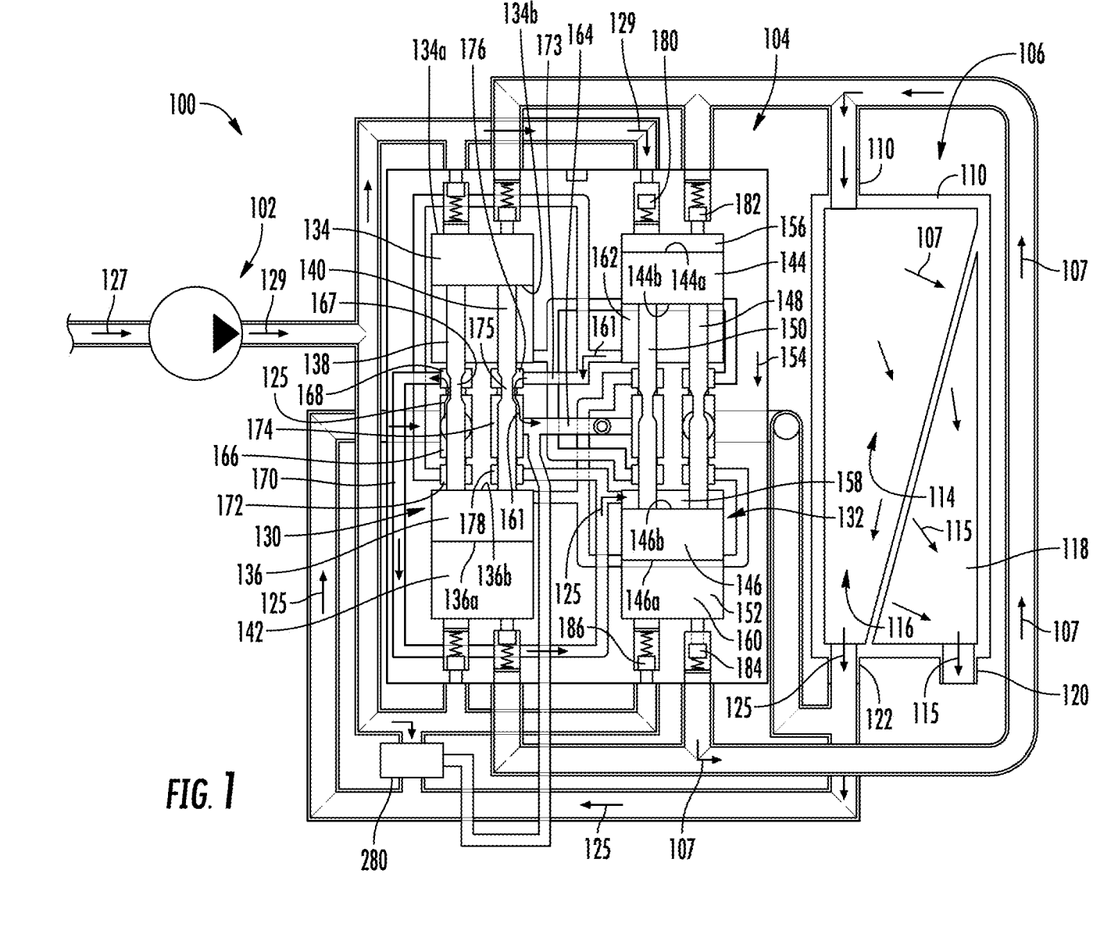
FIG. 1 is a simplified cross-sectional illustration of a reverse osmosis system including an energy recovery system in a first portion of a pumping cycle.

FIG. 1 is a schematic illustration of a reverse osmosis system 100 (also referred to herein as "the system 100") according to an example of the disclosure. The system 100 includes a pump 102, an energy recovery system 104 and a reverse osmosis filter assembly 106.

Pressurized unfiltered water, illustrated by arrow 107, that has been pressurized by way of pump 102 and energy recovery system 104 enters housing 108 of the reverse osmosis filter assembly 106 at inlet 110. A membrane 112 located within housing 108 separates the internal cavity 114 of housing 108 into an unfiltered chamber 116 and a filtered chamber 118.

Filtered water, illustrated by arrows 115, that has passed through membrane 112 will exit housing through clean water exit 120. However, as noted above, not all pressurized unfiltered water will be filtered and exits through wastewater outlet 122 as pressurized wastewater, illustrated by arrow 125. This pressurized wastewater 125 is returned to the energy recovery system 104 to assist in pressurizing the pressurized unfiltered water 107.

The energy recovery system 104 includes first and second pistons 130, 132 that are double-headed pistons. First piston 130 includes first piston head 134 and second piston head 136. The first and second piston heads 134, 136 are connected by first and second piston rods 138, 140. As such, the first and second piston heads 134, 136 travel in the same direction within piston cylinder 142.

The second piston 132 is substantially identical to the first piston 130 and includes third and fourth piston heads 144, 146 and third and fourth piston rods 148, 150. Second piston 132 travels within piston cylinder 152.

Each piston head 134, 136, 144, 146 has a pump side 134a, 136a, 144a, 146a, respectively and a wastewater side 134b, 136b, 144b, 146b. In operation, pressurized pump water, illustrated by arrow 129, will selectively act on or be pumped by the pump sides 134a, 136a, 144a, 146a while pressurized wastewater 125 exiting the reverse osmosis filter assembly 106 will selectively act on or be pumped by the wastewater sides 134b, 136b, 144b, 146b as the first and second pistons 130, 132 are operably driven in reciprocating motion within the piston cylinders 142, 152.

The use of the pressured wastewater 125 allows energy stored therein to assist in driving the pistons 130, 132.

In FIG. 1, the second piston 132 is operably being driven in a downward direction, illustrated by arrow 154. First piston 130 is stationary. To drive the second piston 132, pressurized pump water 129 is pumped into pressure chamber 156 and acts on pump side 144a of the third piston head 144. Also, pressurized wastewater 125 exiting the reverse osmosis filter assembly 106 is operably supplied to pressure chamber 158 and acts on wastewater side 146b of the fourth piston head 146. Thus, both the pressurized pump water 129 and the pressurized wastewater 125 act to drive the second piston 132 in the downward direction 154.

As the second piston 132 moves downward, the unfiltered water within pressure chamber 160 is pressurized into pressurized unfiltered water 107 and is pumped out of piston cylinder 152 by pump side 146a and through the reverse osmosis unit 106.

As the second piston 132 moves downward, depressurized wastewater, illustrated by arrows 161, is pumped out of pressure chamber 162 by wastewater side 144b and operably to drain 164.

The pressurized wastewater 125, during this portion of the cycle, flows into a wastewater chamber 166 through which first piston rod 138 of the first piston 130 extends. The pressurized wastewater 125 flows through a reduced diameter valve region 167 of the first piston rod 138 into outlet chamber 168 and then into conduit 170. The pressurized wastewater 125 flows through conduit 170 to pressure chamber 158. Notably, first piston rod 138 prevents pressurized wastewater 125 from flowing into outlet chamber 172.

Similarly, the depressurized wastewater 161, during this portion of the cycle, flows out of pressure chamber 162 and through conduit 173 and into inlet chamber 176 through which second piston rod 140 of the first piston 130 extends. The depressurized wastewater 161 flows through a reduced diameter valve region 175 of the second piston rod 140 into depressurized wastewater chamber 174 and then into drain 164. Notably, second piston rod 140 prevents depressurized wastewater 161 from flowing into inlet chamber 178.

Flow of the pressurized pump water 129 into pressure chamber 156 is permitted by check valve 180 and is prevented from exiting pressure chamber 156 by check valve 182. Check valve 182 also prevents unfiltered pressurized water 107 from flowing into pressure chamber 156. Flow of the pressurized unfiltered water 107 out of pressure chamber 160 is permitted by check valve 184. Flow of pressurized pump water 129 into pressure chamber 160 is prevented by check valve 186.

Figure 2:
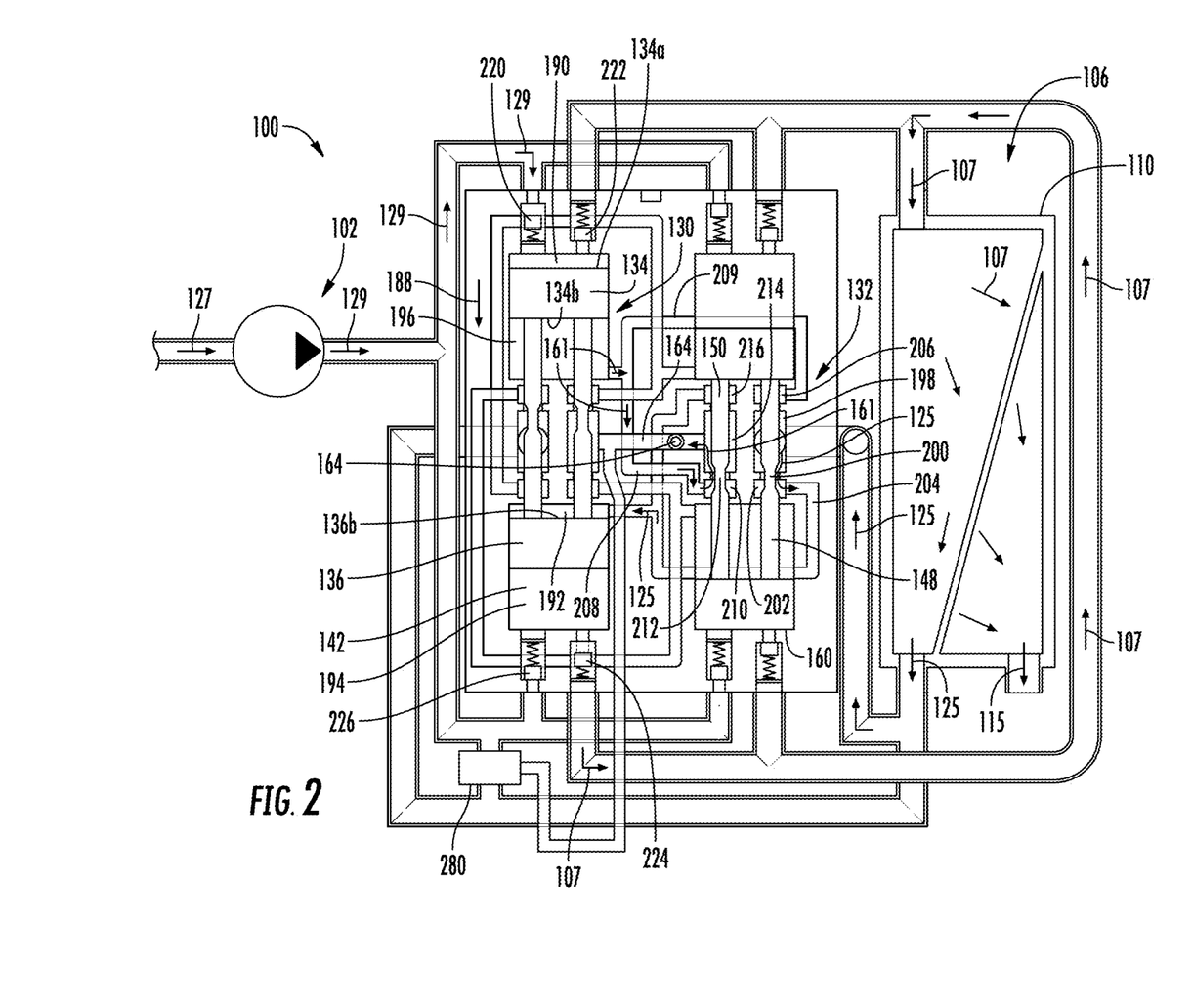
FIG. 2 is a simplified cross-sectional illustration of the reverse osmosis system with the energy recovery system in a second position of a pumping cycle.

FIG. 2 illustrates a second portion of the cycle of the energy recovery system 106. In this portion of the cycle, second piston 132 has reached the fully down position and has pumped all of the pressurized unfiltered water 107 out of pressure chamber 160. Second piston 132 is stationary and first piston 130 is operably being driven in the downward direction, illustrated by arrow 188.

To drive the first piston 130, pressurized pump water 129 is pumped into pressure chamber 190 and acts on pump side 134a of the first piston head 134. Also, pressurized wastewater 125 exiting the reverse osmosis filter assembly 106 is operably supplied to pressure chamber 192 and acts on wastewater side 136b of the second piston head 136. Thus, both the pressurized pump water 129 and the pressurized wastewater 125 act to drive the first piston 130 in the downward direction 188.

As the first piston 132 moves downward, the unfiltered water within pressure chamber 194 is pressurized into pressurized unfiltered water 107 and is pumped out of piston cylinder 142 by pump side 136a and through the reverse osmosis unit 106.

As the first piston 130 moves downward, depressurized wastewater, illustrated by arrows 161, is pumped out of pressure chamber 196 by wastewater side 134b and operably to drain 164.

The pressurized wastewater 125, during this portion of the cycle, flows into a wastewater chamber 198 through which third piston rod 148 of the second piston 132 extends. The pressurized wastewater 125 flows through a reduced diameter valve region 200 of the third piston rod 148 into outlet chamber 202 and then into conduit 204. The pressurized wastewater 125 flows through conduit 204 to pressure chamber 192. Notably, third piston rod 148 prevents pressurized wastewater 125 from flowing into outlet chamber 206.

Similarly, the depressurized wastewater 161, during this portion of the cycle, flows out of pressure chamber 196 and through conduit 208 and into inlet chamber 210 through which fourth piston rod 150 of the second piston 132 extends. The depressurized wastewater 161 flows through a reduced diameter valve region 212 of the fourth piston rod 150 into depressurized wastewater chamber 214 and then into drain 164. Notably, fourth piston rod 150 prevents depressurized wastewater 161 from flowing into inlet chamber 216.

Flow of the pressurized pump water 129 into pressure chamber 190 is permitted by check valve 220 and is prevented from exiting pressure chamber 190 by check valve 222. Check valve 222 also prevents unfiltered pressurized water 107 from flowing into pressure chamber 190. Flow of the pressurized unfiltered water 107 out of pressure chamber 194 is permitted by check valve 224. Flow of pressurized pump water 129 into pressure chamber 194 is prevented by check valve 226.

Figure 3:
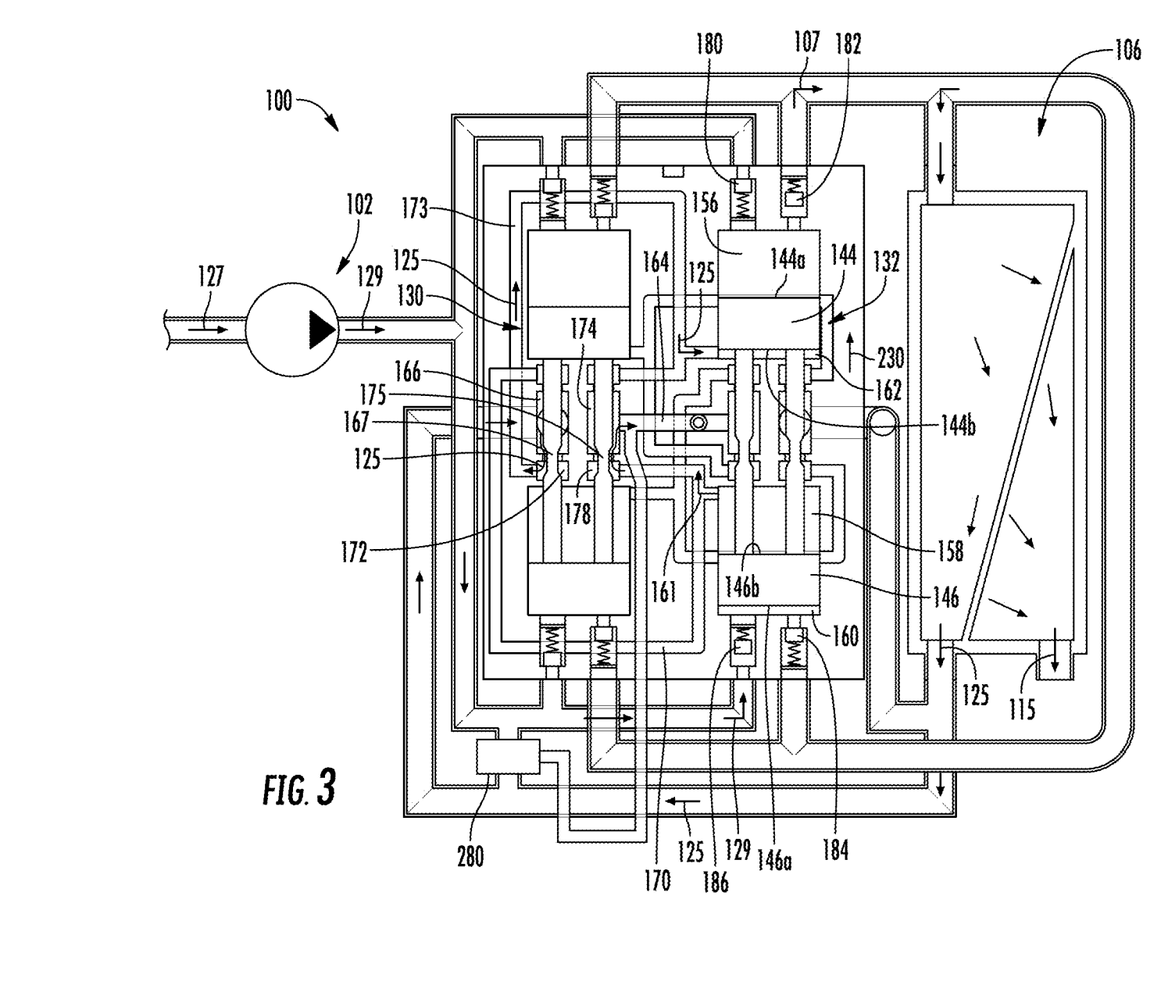
FIG. 3 is a simplified cross-sectional illustration of the reverse osmosis system with the energy recovery system in a third position of a pumping cycle.
Figure 4:
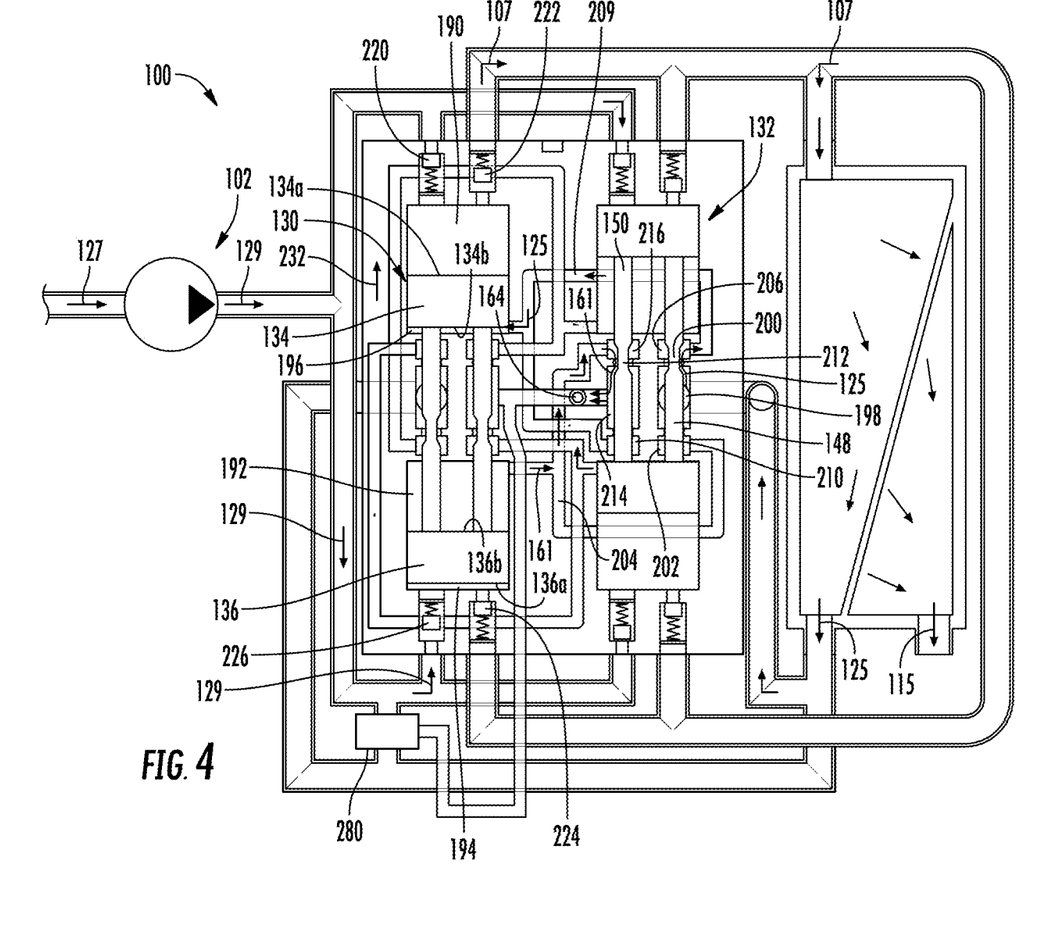
FIG. 4 is a simplified cross-sectional illustration of the reverse osmosis system with the energy recovery system in a fourth position of a pumping cycle.

FIGS. 3 and 4 are similar to FIGS. 1 and 2 and simply illustrate the fluid flow to drive the second piston 132 upward (FIG. 3) as illustrated by arrow 230 while the first piston 130 remains stationary and then to drive the first piston 130 upward (FIG. 4) as illustrated by arrow 232 while the second piston 132 remains stationary. Thereafter, the cycle repeats transitioning from FIG. 1 through FIG. 4.

In FIG. 3, to drive the second piston 132 upward, pressurized pump water 129 is pumped into pressure chamber 160 and acts on pump side 146a while pressurized wastewater 125 is supplied to pressure chamber 162 and acts on wastewater side 144b. This drives the second piston 132 upward pumping the pressurized unfiltered water 107 out of pressure chamber 156 by pump side 144a and to the reverse osmosis unit 106. Depressurized wastewater 161 is pumped out of pressure chamber 158 by wastewater side 146b and operably to drain 164.

The pressurized wastewater 125 flows into wastewater chamber 166. The reduced diameter valve region 167 of first piston rod 138 communicates the wastewater chamber 166 with second outlet chamber 172 rather than outlet chamber 168. The pressurized wastewater 125 flows through conduit 173 to pressure chamber 162. Notably, the portion of conduit 173 in communication with inlet chamber 176 has generally stagnant water therein as the flow out of inlet chamber 176 is closed off by the second piston rod 140.

Depressurized wastewater 161 flows out of pressure chamber 158 and through conduit 170 and into inlet chamber 178. The reduced diameter valve region 175 communicates inlet chamber 178 with the depressurized wastewater chamber 174. From there, the depressurized wastewater 161 flows to the drain 164.

The check valves 180, 182, 184, 186 now switch from being open to closed or closed to open due to the change in function of the corresponding pressure chambers 156, 160.

In FIG. 4, to drive the first piston 130 upward, pressurized pump water 129 is pumped into pressure chamber 194 and acts on pump side 136a while pressurized wastewater 125 is supplied to pressure chamber 196 and acts on wastewater side 134b. This drives the first piston 130 upward pumping the pressurized unfiltered water 107 out of pressure chamber 190 by pump side 134a and to the reverse osmosis unit 106. Depressurized wastewater 161 is pumped out of pressure chamber 192 by wastewater side 136b and operably to drain 164.

The pressurized wastewater 125 flows into wastewater chamber 198. The reduced diameter valve region 200 of third piston rod 148 communicates the wastewater chamber 198 with outlet chamber 206 rather than outlet chamber 202. The pressurized wastewater 125 flows through conduit 209 to pressure chamber 196. Notably, the portion of conduit 209 in communication with inlet chamber 210 has generally stagnant water therein as the flow out of inlet chamber 210 is closed off by the fourth piston rod 150.

Depressurized wastewater 161 flows out of pressure chamber 192 and through conduit 204 and into inlet chamber 216. The reduced diameter valve region 212 communicates inlet chamber 216 with the depressurized wastewater chamber 214. From there, the depressurized wastewater 161 flows to the drain 164.

The check valves 220, 222, 224, 226 now switch from being open to closed or closed to open due to the change in function of the corresponding pressure chambers 190, 194.

It is a desire to reduce electrical use and/or pump size for these systems. This done by increasing the efficiency of the system. The applicants have determined several things to increase efficiency and have been able to obtain efficiencies in excess of 14%.

Figure 5:
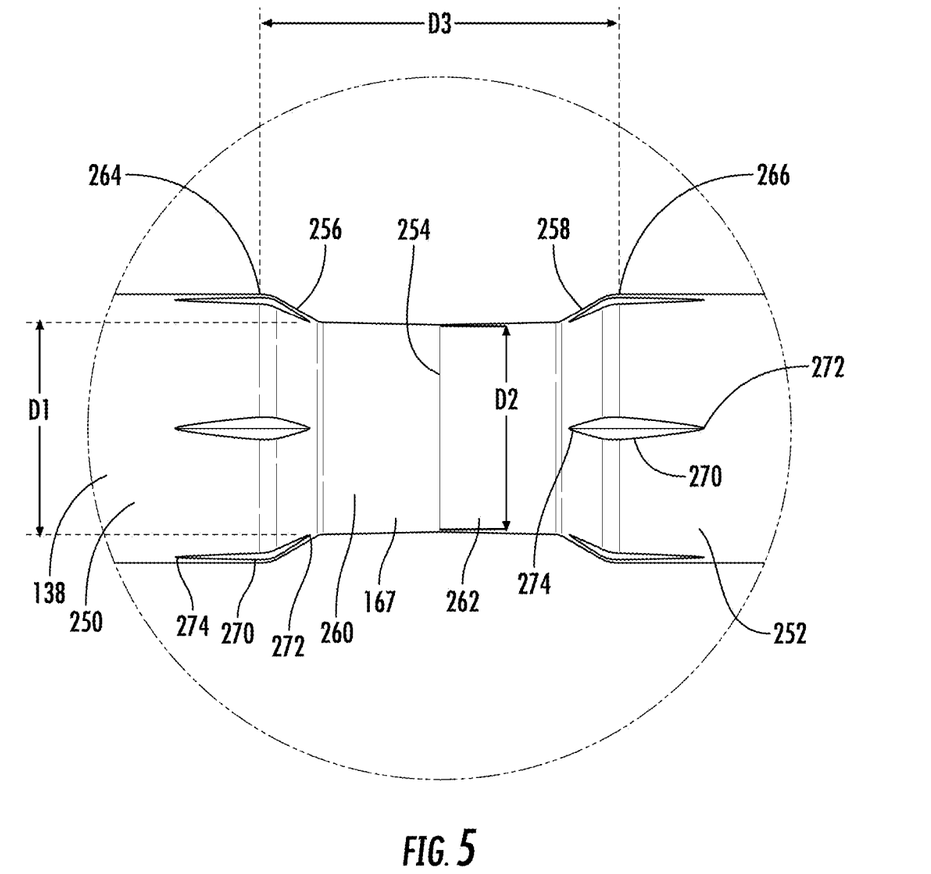
FIG. 5 is an enlarged cross-sectional illustration of a portion of a piston rod of one of the pistons of the energy recovery system.

To provide improved efficiencies, the applicants have improved the design of the piston rods 138, 140, 148, 150. FIG. 5 is a cross-sectional illustration of a portion of piston rod 138 including the reduced diameter valve region. As all piston rods 138, 140, 148, 150 are the same, only piston rod 138 will be described.

Piston rod 138 includes has first and second cylindrical regions 250, 252 between which reduced diameter valve region 167 is located. First and second transition regions 256, 258 transition cylindrical regions 250, 252 to reduced diameter valve region 167. In this example, the reduced diameter valve region 167 has opposed tapered regions 260, 262 that reduce in diameter when moving from ends at corresponding transition regions 256, 258 towards midpoint 254. In one example, the tapered regions have a major diameter D1 that is between approximately 0.385 and 0.395 inches and a minor diameter at D2 that is between approximately 0.378 and 0.386 inches.

In one example, the distance D3, measured parallel to a longitudinal axis of the piston rod 138, between outermost ends 264, 266 of the transition regions 256, 258, e.g. where the transition regions 256, 258 intersect the first and second cylindrical regions 250, 252, is between approximately 0.651 and 0.675 inches. In one example, the first and second transition regions 256, 258 have an axial length along the longitudinal axis measured between the corresponding outermost ends 264, 266 and corresponding intersection and the ends of the adjacent tapered regions 260, 262 of between 0.0855 and 0.1055 inches. These values improve efficiency by limiting the amount of water that must pass through the reduced diameter valve region 167. Therefore, pressure exiting will increase faster with less inlet pressure going in the system. Some resulting systems can have a recovery in excess of 14% and in some examples in excess of 14.2%.

The piston rod 138 includes pressure relief grooves 270 that have one end 272 formed in one of the cylindrical regions 250, 252 and another end 274 in the adjacent transition region 256, 258. These grooves 270 assist in balancing pressure as the reduced diameter valve regions 167 transitions between which chambers are being fluidly communicated as a piston moves during the pumping cycle.

Figure 6:
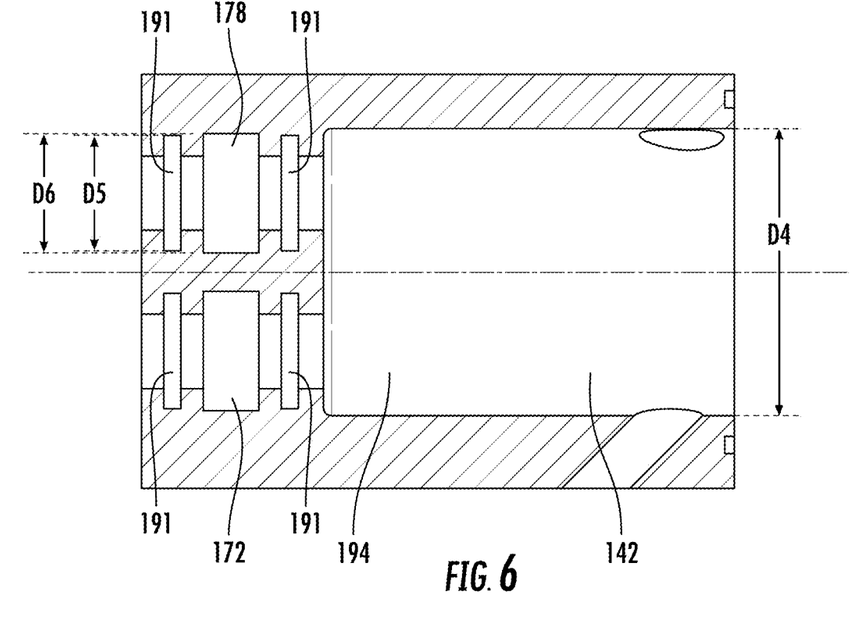
FIG. 6 is an enlarged cross-sectional illustration of a portion of a piston cylinder for one of the pistons of the energy recovery system.
Figure 9:
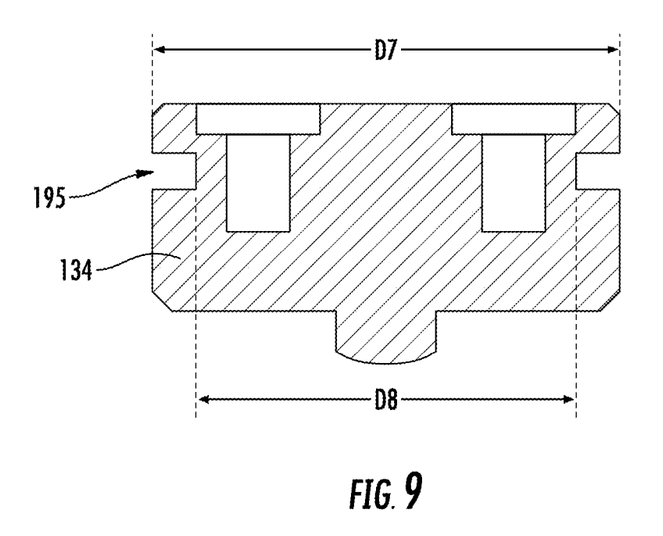
FIG. 9 is a cross-sectional illustration of a piston head of the pistons of the energy recover system.

The applicants have also determined improved bore sizes for the piston cylinder 142 and piston heads 134. FIG. 6 illustrates a portion of piston cylinder 142 including pressure chamber 194 outlet chamber 172 and inlet chamber 178. In one example diameter D4 of pressure chamber 194 is between 1.875 and 1.879 inches, the diameter D5 is of seal mounting groove 191 that holds a seal member, such as a o-ring, that seals with the outer diameter of the cylindrical portions of the piston rods and has a value of between approximately 0.733 and 0.737 inches, the diameter D6 is of the outlet or inlet chambers 172, 178 and has a value of between 0.785 and 0.789 inches. The corresponding piston head 134 is illustrated in FIG. 9. These values improve the efficiency of the system by reducing the amount of wastewater that is stored within the various chambers 172, 178, 142. Piston head 134 has an outer diameter D7 of between 1.869 and 1.873 inches. Further, in some embodiments, the piston head 134 has an o-ring retaining groove 195 having an inner diameter D8 of between 1.508 and 1.512 inches.

Smaller bore size allows for increased recovery rate to in excess of 14% and preferably in excess of 14.25. Again, this allows less water to pass through and therefore pressure exiting will increase faster with less inlet pressure going in the system.

Due to the use of the pressurized wastewater 125 to help drive the pistons 130, 132, it is possible for pressurized wastewater 125 to lockup the pistons 130, 132 or slow down/inhibit startup of the motion of a piston 130, 132 when the system is started after being shutdown after prior use. This undesirably increases the amount of time it takes for the system to reach the target working pressure.

With reference to FIG. 1, to combat the possible negative effects of the pressurized wastewater 125 at startup, the system 100 includes a pressure release valve 280 that can selectively drain or otherwise relieve the pressure of the pressurized wastewater 125 within the system when the pump 102 is deenergized. Thus, when the pump 102 is reenergized, the wastewater 125 within the system is not pressurized reducing any negative effects on driving the relevant piston 130, 132 and getting the system up to the target working pressure.

Figure 7:
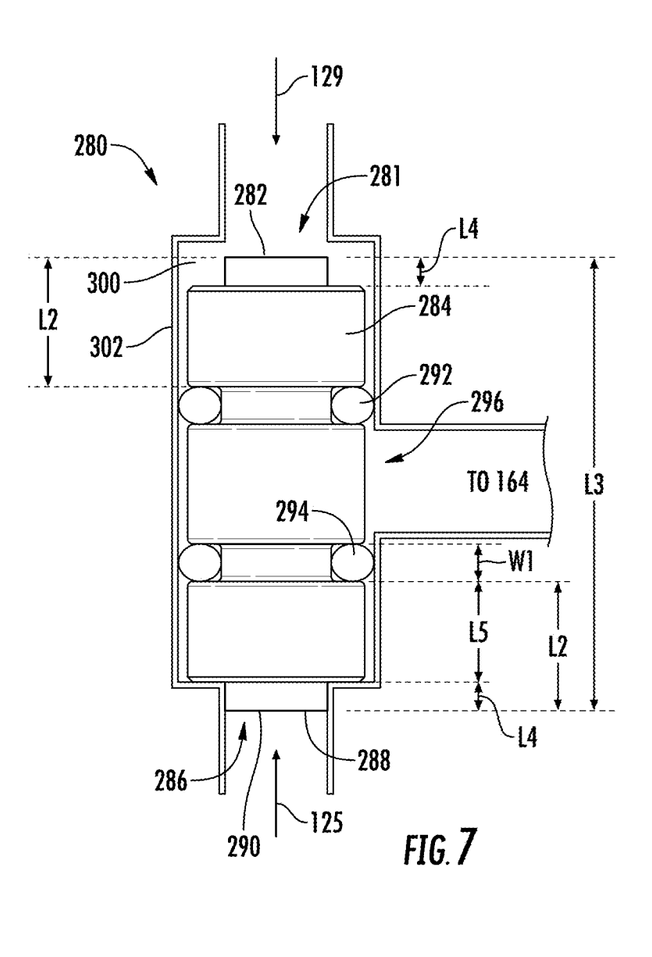
FIG. 7 is a simplified illustration of the pressure release valve of the energy recovery system illustrated in an operational state when the energy recovery system is activated.

FIG. 7 illustrates the release valve 280 when the system is on and pump 102 is energized and the release valve 280 is in its steady state position. Here, pump 102 is generating pressurized pump water 129 within the system. The pressurized pump water 129 flows through port 281 and acts on end 282 of valve member 284. The pressure from pressurized pump water 129 acts on the entire surface area of end 282 and has driven valve member 284 to close off port 286 with second end 288 of valve member 284. The pressurized wastewater 125 acts on a reduced diameter portion 290 of second end 288 such that the pressurized wastewater 125 cannot overcome the force exerted by pressurized pump water 129.

In FIG. 7, the reduced diameter region 290 seals with the portion of the valve housing that defines port 286.

The valve member 284 carries a pair of o-rings 292, 294. With the valve member 284 in this position, o-rings 292, 294 seal off drain port 296. Thus, no fluid is able to flow through drain port 296 such that pressure of pressurized pump water 129 and the pressure of pressurized wastewater 125 remains. In this position, the o-ring 292 is between port 281 and port 296 and o-ring 294 is between port 286 and port 296.

In an embodiment, the length L2 between end 282 and o-ring 292 or end 288 and o-ring 294 is between 0.262 and 0.274 inches. This provides a short stroke length for valve member 284. In one example, the length L3 from the first end 282 to the second end 288 is between about 0.943 and 0.945. Further yet, in one example, the length L4 between the ends and the immediately adjacent enlarged diameter portions is approximately 0.57 and 0.061 inches. In one example, the length L5 is between 0.207 and 0.211 inches. Further, in one example, the gap in which o-rings 292, 294 are located has a width W1 of between 0.079 and 0.084 inches.

Figure 8:
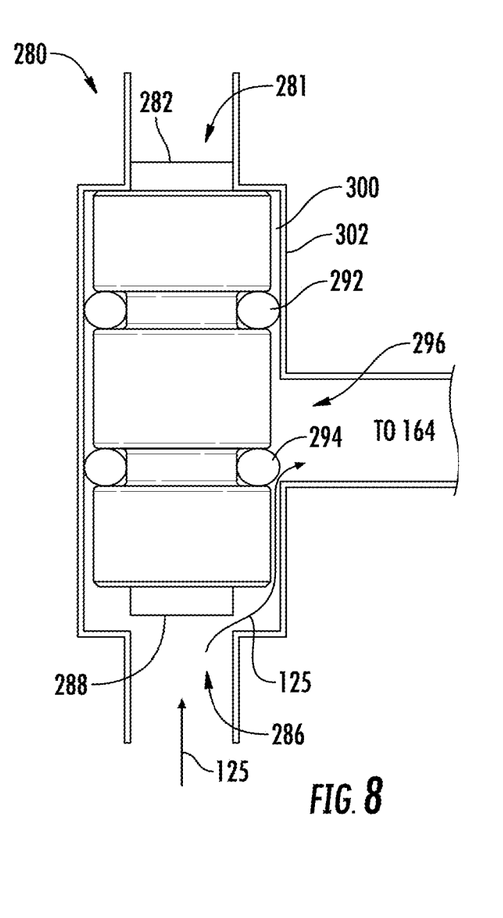
FIG. 8 is a simplified illustration of the pressure release valve of the energy recovery system illustrated in an operational state when the energy recovery system is deactivated.

FIG. 8 illustrates the release valve 280 when the system is off and pump 102 is deenergized. With the pump deenergized, no pressurized pump water 129 is supplied to act on first end 282. The pressure of pressurized wastewater 125 acts on second end 288 and drives the release valve such that second end 288 and particularly reduce diameter portion 290 is removed from port 286. Further, o-ring 294 no longer seals off port 286 and pressurized wastewater 125 can drain through port 296. With the pump 129 no longer active, the pressure within the conduits within the system, e.g. for carrying the wastewater 125 as well as the pump water 129 dissipates. As such, there is no pressurized wastewater 125 locked within the system once the system is restarted. When pump 102 is reenergized, the pressurized pump water 129 then acts on first end 282 and drives valve member 284 to close port 286 such as illustrated in FIG. 7. Only once the pump 102 is deenergized, the pressurized wastewater 125 will move valve member 284 move to open port 296.

As is illustrated in FIGS. 7 and 8, the valve member 284 is carried within a valve chamber 300 provided by valve body 302. The valve body 302 has pump water port 281, wastewater port 286 and drain port 296. In the first orientation of FIG. 7, the valve member 284 prevents fluid flow through the release valve 280. In the second orientation of FIG. 8, the valve member 284 has shifted and allows fluid flow from the wastewater port 286 to the drain port 296, thereby releasing any pressure within the system of the wastewater that could inhibit startup of the motion of pistons 130, 132.

The applicants have determined that the instant valve member 284 and valve design provides a shorter stroke length. The design and shorter stroke length allows the system to build and release pressure faster.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A reverse osmosis energy recovery system comprising:
   a first piston having a first piston head and a second piston head connected to the first piston head, the first and second piston heads each having a pump side and a wastewater side;
   a second piston having a third piston head and a fourth piston head connected to the third piston head, the third and fourth piston heads each having a pump side and a wastewater side;
   a pump water conduit for supplying water from a pump to the pump side of the first, second, third and fourth piston heads;
   a wastewater conduit for supplying pressurized wastewater from a reverse osmosis filter arrangement to the wastewater side of the of first, second, third and fourth piston heads;
   a release valve having:
      a valve body having a pump water inlet port in fluid communication with the pump water conduit, a wastewater inlet port in fluid communication with the wastewater conduit, and a drain port;
      a valve member within the valve body movable between a first position in which fluid is prevented from flowing from the wastewater inlet port to the drain port and a second position in which fluid is permitted to flow from the wastewater inlet port to the drain port; and
   wherein the pump water within the pump water conduit drives the valve member to and maintains the valve member in the first position while the system is energized and the fluid within the pump water conduit is pressurized and the wastewater within the wastewater conduit drives the valve member to the second position when the system is deactivated and the pump water is not pressurized.

2. The reverse osmosis energy recovery system of claim 1, wherein the valve member has a length between a distal end thereof and an o-ring carried thereby of between about 0.262 and 0.274 inches.

3. The reverse osmosis energy recovery system of claim 1, wherein the valve member carries first and second o-rings, the first and second o-rings being axially spaced apart along an axis defined by the valve member, the first o-ring being axially spaced from a first end of the valve member between about 0.262 and 0.274 inches and the second o-ring being spaced from a second end of the valve member between about 0.262 and 0.274 inches.

4. The reverse osmosis energy recovery system of claim 3, wherein the valve member translates within the valve body along the axis between the first and second positions.

5. The reverse osmosis energy recovery system of claim 3, wherein:
   the first o-ring is located between and seals the wastewater inlet port from the drain in the first position and the second o-ring is located between and seals the pump water inlet port from the drain in the first position; and
   the first o-ring does not seal the wastewater inlet port from the drain in the first position.

6. The reverse osmosis energy recover system of claim 1, wherein:
   a first end of the valve member has a first region and a second region, wastewater within the wastewater conduit acting against only the first region when the valve member is in the first position;
   a second end of the valve member has a first region and a second region, pressurized pump water acting on the first and second regions when the valve member is in the first position.

7. A reverse osmosis system comprising:
   a pump
   a reverse osmosis filter arrangement having a wastewater outlet;
   a reverse osmosis energy recovery system including:
      a first piston having a first piston head and a second piston head connected to the first piston head, the first and second piston heads each having a pump side and a wastewater side;
      a second piston having a third piston head and a fourth piston head connected to the third piston head, the third and fourth piston heads each having a pump side and a wastewater side;
      a pump water conduit fluidly connected to the pump for supplying water from the pump to the pump side of the first, second, third and fourth piston heads;
      a wastewater conduit fluidly connected to the waste water outlet of the reverse osmosis filter arrangement for supplying pressurized wastewater from the reverse osmosis filter arrangement to the wastewater side of the of first, second, third and fourth piston heads;

a release valve having:
- a valve body having a pump water inlet port in fluid communication with the pump water conduit, a wastewater inlet port in fluid communication with the wastewater conduit, and a drain port;
- a valve member within the valve body movable between a first position in which fluid is prevented from flowing from the wastewater inlet port to the drain port and a second position in which fluid is permitted to flow from the wastewater inlet port to the drain port; and wherein:
while the system is energized and the pump is pressurizing the pump water within the pump water conduit, the pressurized pump water drives the valve member to and maintains the valve member in the first position;

upon deenergization of the system such that the pump is no longer pressurizing the pump water within the pump water conduit, the wastewater within the wastewater conduit drives the valve member to the second position such that pressure within wastewater conduit is relieved.

8. A reverse osmosis energy recovery system comprising:
a first piston having:
- a first piston head and a second piston head connected to the first piston head, the first and second piston heads each having a pump side and a wastewater side;
- first and second piston rods connecting the first piston head to the second piston head, each of the first and second piston rods having opposed, spaced apart first and second cylindrical portions and a reduced diameter region interposed between the first and second cylindrical portions, the reduced diameter region having a maximum diameter of between 0.385 and 0.395 inches.

9. The reverse osmosis energy recovery system of claim 8, wherein the first and second piston rods each have first and second transition regions, the first transition region tapering from the first cylindrical portion to a first end of the reduced diameter region, the second transition region tapering from the second cylindrical portion to a second end of the reduced diameter region.

10. The reverse osmosis energy recovery system of claim 9, wherein the maximum diameter of the reduced diameter region is at the first and second ends.

11. The reverse osmosis energy recovery system of claim 10, wherein the reduced diameter region has a midpoint between the first and second ends, the midpoint having a minimum diameter of the reduced diameter region, the minimum diameter being between 0.378 and 0.386 inches.

12. The reverse osmosis energy recovery system of claim 11, wherein:
a first portion of the reduced diameter region between the first end and the midpoint tapers between the first end and the midpoint, with the diameter of the first portion decreasing when moving from the first end toward the midpoint; and
a second portion of the reduced diameter region between the second end and the midpoint tapers between the second end and the midpoint, with the diameter of the second portion decreasing when moving from the second end toward the midpoint.

13. The reverse osmosis energy recovery system of claim 9, further comprising:
at least one pressure relief groove having a first end formed in the first cylindrical portion and a second end formed in the first transition region; and
at least one pressure relief groove having a first end formed in the second cylindrical portion and a second end formed in the second transition region.

14. The reverse osmosis energy recovery system of claim of 9, wherein a first intersection between the first cylindrical portion and the first transition region is spaced apart along a longitudinal axis of the piston rod a length of between 0.651 and 0.675 inches from a second intersection between the second cylindrical portion and the second transition region.

15. The reverse osmosis energy recovery system of claim 14, wherein the first transition region has an axial length along the longitudinal axis measured between the first intersection and the first end of between 0.0855 and 0.1055 inches; and
the second transition region has an axial length along the longitudinal axis measured between the second intersection and the second end of between 0.0855 and 0.1055 inches.

16. The reverse osmosis energy recovery system of claim 8, wherein the piston head is received in a piston cylinder, the piston head has an outer diameter of between 1.869 and 1.873 inches and the piston cylinder has an inner diameter of between 1.875 and 1.879 inches.

17. The reverse osmosis energy recovery system of claim 8, further comprising
a second piston having:
- a third piston head and a fourth piston head connected to the third piston head, the third and fourth piston heads each having a pump side and a wastewater side;
- third and fourth piston rods connecting the third piston head to the fourth piston head, each of the third and fourth piston rods having opposed, spaced apart first and second cylindrical portions and a reduced diameter region interposed between the first and second cylindrical portions, the reduced diameter region having a maximum diameter of between 0.385 and 0.395 inches.

18. The reverse osmosis energy recovery system of claim 8, wherein:
the first piston is located within a first piston cylinder, the first piston cylinder including a depressurized wastewater outlet chamber in fluid communication with a drain and first and second depressurized wastewater inlet chambers, the depressurized wastewater outlet chamber being positioned between the first and second depressurized wastewater inlet chambers, the second piston rod extending through the depressurized wastewater outlet chamber and first and second depressurized wastewater inlet chambers, the reduced diameter region of the second piston rod fluidly communicating the first depressurized wastewater inlet chamber with the depressurized wastewater outlet chamber in a first piston first position, the reduced diameter region of the second piston rod fluidly communicating the second depressurized wastewater inlet chamber with the depressurized wastewater outlet chamber in a first piston second position, the first cylindrical portion of the second piston rod sealing the second depressurized wastewater inlet chamber when in the first piston first position, the second cylindrical portion of the second piston rod sealing the first depressurized wastewater inlet chamber when in the first piston second position;

the first piston cylinder including a high pressure wastewater inlet chamber in fluid communication with a high pressure wastewater outlet of a reverse osmosis filtration unit, the first piston cylinder including first and second high pressure wastewater outlet chambers, the high pressure wastewater inlet chamber being positioned between the first and second high pressure wastewater outlet chambers, the first piston rod extending through the high pressure wastewater inlet chamber and first and second high pressure wastewater outlet chambers, the reduced diameter region of the first piston rod fluidly communicating the first high pressure wastewater outlet chamber with the high pressure wastewater inlet chamber in the first piston first position, the reduced diameter region of the first piston rod fluidly communicating the second high pressure wastewater outlet chamber with the high pressure wastewater inlet chamber in the first piston second position, the first cylindrical portion of the first piston rod sealing the second high pressure wastewater outlet chamber when in the first piston first position, the second cylindrical portion of the first piston rod sealing the first high pressure wastewater outlet chamber when in the first piston second position;

the first and second cylindrical portions of the first piston rod sealing both the first and second high pressure wastewater outlet chambers when the first piston is in a first piston third position, the first and second cylindrical portions of the second piston rod sealing both the first and second depressurized wastewater inlets when the first piston is in the first piston third position.

* * * * *